US012020604B2

(12) United States Patent
Tone

(10) Patent No.: US 12,020,604 B2
(45) Date of Patent: Jun. 25, 2024

(54) DISPLAY CONTROL METHOD, CONTROL METHOD FOR DISPLAY DEVICE, AND DISPLAY DEVICE

(71) Applicant: SEIKO EPSON CORPORATION, Tokyo (JP)

(72) Inventor: Takehiko Tone, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/127,706

(22) Filed: Mar. 29, 2023

(65) Prior Publication Data
US 2023/0316960 A1    Oct. 5, 2023

(30) Foreign Application Priority Data
Mar. 30, 2022    (JP) .................................. 2022-056174

(51) Int. Cl.
*G09G 3/00*    (2006.01)
*H04N 9/31*    (2006.01)
(52) U.S. Cl.
CPC ....... *G09G 3/001* (2013.01); *G09G 2300/026* (2013.01); *G09G 2340/12* (2013.01); *H04N 9/3179* (2013.01)
(58) Field of Classification Search
CPC ............. G09G 3/001; G09G 2300/026; G09G 2340/12; H04N 9/3179
See application file for complete search history.

(56) References Cited

U.S. PATENT DOCUMENTS

| 11,496,718 B2* | 11/2022 | Tseng ................... H04N 9/3147 |
| 11,695,906 B2* | 7/2023 | Ishida ................... H04N 9/3147 348/744 |
| 2006/0181685 A1* | 8/2006 | Hasegawa .............. G03B 37/04 353/69 |
| 2017/0127028 A1* | 5/2017 | Oike ..................... H04N 9/3185 |
| 2017/0214895 A1* | 7/2017 | Fujioka ................ H04N 9/3147 |
| 2018/0013995 A1* | 1/2018 | Mizushiro ............ H04N 9/3182 |
| 2018/0084234 A1 | 3/2018 | Yamamoto et al. |
| 2019/0037265 A1 | 1/2019 | Kitabayashi et al. |

(Continued)

FOREIGN PATENT DOCUMENTS

| JP | 2003-345327 A | 12/2003 |
| JP | 2018-050144 A | 3/2018 |

(Continued)

OTHER PUBLICATIONS

"Examples of Brightsign & Geobox Combinations", Japan Material Co., Ltd is at least Feb. 29, 2022.

*Primary Examiner* — Ricardo Osorio
(74) *Attorney, Agent, or Firm* — Oliff PLC

(57) ABSTRACT

A display device comprising a first interface receiving a first image, a second interface receiving a second image, and at least one processor executing, generating a first composite image including the first image and a part of the second image, and displaying the first composite image on a display surface, the first composite image including a first area, and a first superimposition area that is a different part from the first area and that includes the part of the second image, the first superimposition area being superimposed on the part of the second image displayed by another display device at the display surface.

9 Claims, 11 Drawing Sheets

(56) References Cited

U.S. PATENT DOCUMENTS

| | | | |
|---|---|---|---|
| 2020/0137367 A1* | 4/2020 | Cian | G06T 7/73 |
| 2021/0127096 A1* | 4/2021 | Lin | H04N 9/3147 |
| 2021/0329202 A1* | 10/2021 | Cian | G06T 7/73 |
| 2023/0096353 A1* | 3/2023 | Li | H04N 9/3194 |
| | | | 353/94 |

FOREIGN PATENT DOCUMENTS

| | | | |
|---|---|---|---|
| JP | 2019-028208 A | 2/2019 |
| JP | 2019-054421 A | 4/2019 |
| JP | 2021-073507 A | 5/2021 |
| JP | 2021-096389 A | 6/2021 |

* cited by examiner

DISPLAY CONTROL METHOD, CONTROL METHOD FOR DISPLAY DEVICE, AND DISPLAY DEVICE

The present application is based on, and claims priority from JP Application Serial Number 2022-056174, filed Mar. 30, 2022, the disclosure of which is hereby incorporated by reference herein in its entirety.

BACKGROUND

1. Technical Field

The present disclosure relates to a display control method, a control method for a display device, and a display device.

2. Related Art

According to the related art, a display system for displaying one image, using a plurality of display devices, is known.

For example, JP-A-2019-54421 discloses a multi-projection system in which a plurality of projectors are daisy-chained and in which image data is transmitted from a projector of a higher rank to a projector of a lower rank in the order of receiving image data in the daisy chain.

However, when one image displayed by a plurality of display devices is transmitted between the plurality of daisy-chained display devices to implement the display of a large-screen image, the size of an image that can be transmitted and received by the display devices via one interface is limited and therefore an image of a larger size than the image size that can be transmitted and received via one interface between the plurality of daisy-chained display devices cannot be handled.

SUMMARY

According to an aspect of the present disclosure, a control method for a display system includes: causing a first display device to execute receiving a first image via a first interface provided in the first display device, receiving a second image via a second interface provided in the first display device, generating a first composite image including the first image and a part of the second image, and displaying the first composite image on a display surface; and causing a second display device to execute receiving the second image via a third interface provided in the second display device, and displaying the second image on the display surface. The first composite image includes a first area that is a part of the first composite image, and a first superimposition area that is a different part from the first area of the first composite image and that includes a part of the second image. The second image includes a second superimposition area including a part of the second image and superimposed on the first superimposition area at the display surface, and a second area that is a different part from the second superimposition area of the second image.

According to another aspect of the present disclosure, a control method for a display device includes executing: receiving a first image via a first interface provided in a display device; receiving a second image via a second interface provided in the display device; generating a first composite image including the first image and a part of the second image; and displaying the first composite image on a display surface. The first composite image includes a first area that is a part of the first composite image, and a first superimposition area that is a different part from the first area of the first composite image and that includes a part of the second image. In an area where the first superimposition area is displayed, of the display surface, a part of the second image is displayed by another display device.

According to still another aspect of the present disclosure, a display device includes: a first interface receiving a first image; a second interface receiving a second image; and a controller executing generating a first composite image including the first image and a part of the second image, and displaying the first composite image on a display surface. The first composite image includes a first area that is a part of the first composite image, and a first superimposition area that is a different part from the first area of the first composite image and that includes a part of the second image. In an area where the first superimposition area is displayed, of the display surface, apart of the second image is displayed by another display device.

DESCRIPTION OF EXEMPLARY EMBODIMENTS

1. System Configuration of Display System

Figure 1:
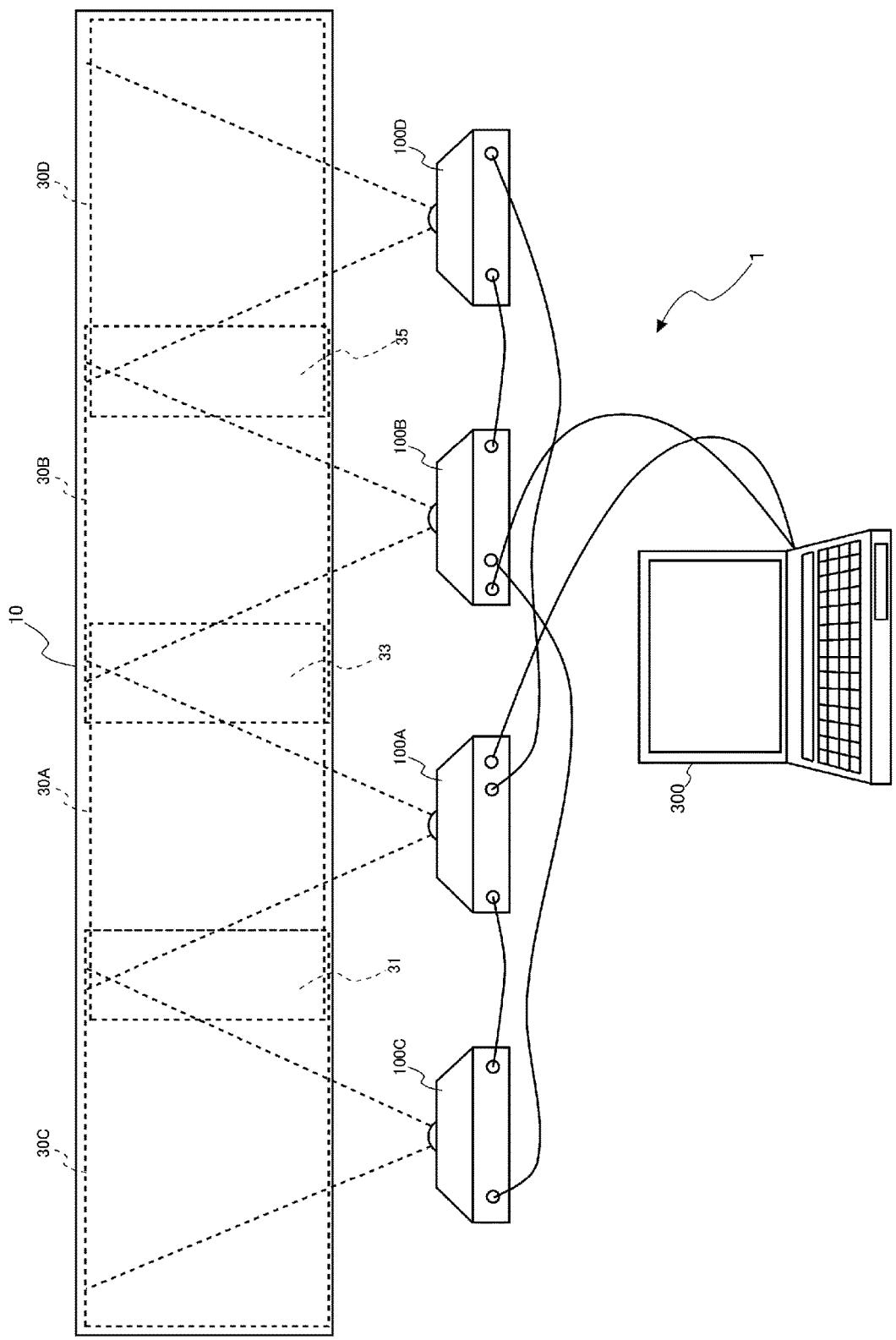
FIG. 1 shows a system configuration of a projection system.

FIG. 1 shows a system configuration of a display system 1.

The display system 1 has a plurality of projectors 100 and an image supply device 300.

FIG. 1 shows a configuration where the display system 1 has four projectors 100A, 100B, 100C, and 100D. However, the number of projectors 100 is not limited to four. In the description below, the projectors 100A, 100B, 100C, and 100D are referred to as the projector 100 when these projectors need not be distinguished from each other. The projector 100A is equivalent to a first display device. The projector 100B is equivalent to a second display device. The projector 100C is equivalent to a third display device. The projector 100D is equivalent to a fourth display device.

As the image supply device 300, for example, a laptop PC (personal computer), a desktop PC, a tablet terminal, a smartphone, a PDA (personal digital assistant) is used.

FIG. 1 shows an example where the projectors 100A, 100B, 100C, and 100D are arranged next to each other in a line along the horizontal direction of a projection surface 10. For the arrangement of the projectors 100A, 100B, 100C, and 100D, a configuration where the projectors 100A, 100B, 100C, and 100D are arranged next to each other along the vertical direction of the projection surface 10 may be employed.

Each of the projectors 100A, 100B, 100C, and 100D projects image light onto the projection surface 10 and thus displays an image on the projection surface 10. An area on the projection surface 10 where the image is displayed by the projectors 100A, 100B, 100C, and 100D is referred to as a display area 30. The projection surface 10 is equivalent to a display surface.

The display area 30 on the projection surface 10 is divided into four areas.

The display area 30 where the projector 100A displays an image is referred to as a display area 30A.

The display area 30 where the projector 100B displays an image is referred to as a display area 30B.

The display area 30 where the projector 100C displays an image is referred to as a display area 30C.

The display area 30 where the projector 100D displays an image is referred to as a display area 30D.

The display area 30A is equivalent to a first display area. The display area 30B is equivalent to a second display area. The display area 30C is equivalent to a third display area. The display area 30D is equivalent to a fourth display area. The display area 30A and the display area 30B are adjacent to each other in a first direction, which is the horizontal direction of the projection surface 10. FIG. 1 shows the example where the projectors 100A, 100B, 100C, and 100D are arranged next to each other in a line along the horizontal direction of the projection surface 10. However, the projectors 100A, 100B, 100C, and 100D may be arranged next to each other along the vertical direction of the projection surface 10. In this case, the display area 30A and the display area 30B are adjacent to each other in a second direction, which is the vertical direction of the projection surface 10.

The right end of the display area 30C overlaps the left end of the display area 30A as viewed in the drawing.

The right end of the display area 30A overlaps the left end of the display area 30B as viewed in the drawing.

The right end of the display area 30B overlaps the left end of the display area 30D as viewed in the drawing.

An area where the right end of the display area 30C and the left end of the display area 30A overlap each other as viewed in the drawing is referred to as a display superimposition area 31. An area where the right end of the display area 30A and the left end of the display area 30B overlap each other as viewed in the drawing is referred to as a display superimposition area 33. An area where the right end of the display area 30B and the left end of the display area 30D overlap each other as viewed in the drawing is referred to as a display superimposition area 35.

In the display superimposition area 31, edge blending is performed and the luminance of the image displayed by the projector 100A and the image displayed by the projector 100C is adjusted. That is, the projector 100C adjusts the luminance of the image displayed in the display superimposition area 31 in such a way as to reduce the difference in luminance between the area where only the projector 100C displays the image and the display superimposition area 31, of the display area 30C. Similarly, the projector 100A adjusts the luminance of the image displayed in the display superimposition area 31 in such a way as to reduce the difference in luminance between the area where only the projector 100A displays the image and the display superimposition area 31, of the display area 30A. A similar adjustment is made in the display superimposition area 33 and the display superimposition area 35.

2. Configuration of Projector

Figure 2:
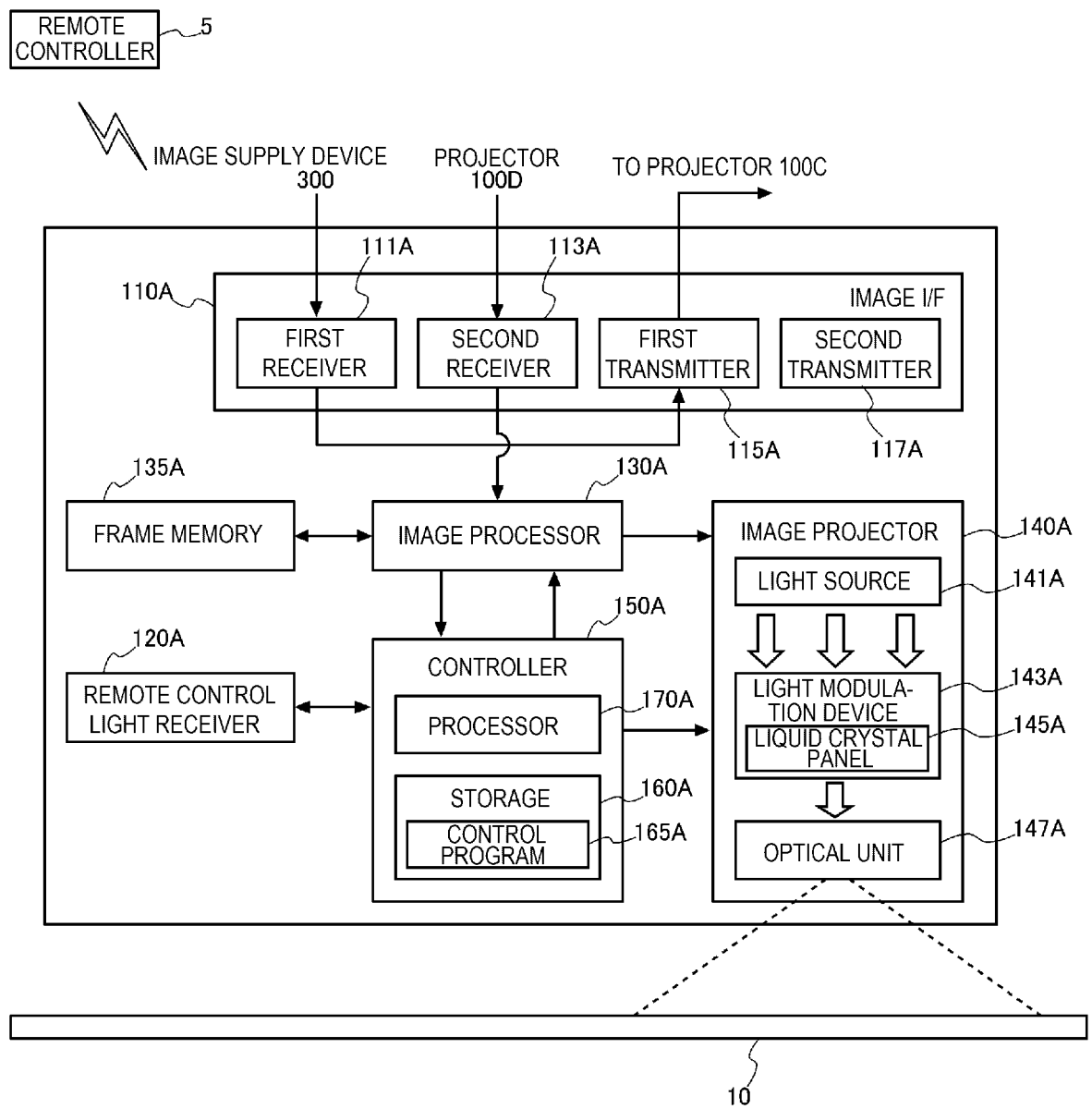
FIG. 2 is a block diagram showing a configuration of a projector.

FIG. 2 is a block diagram showing a configuration of the projector 100A.

The configuration of the projector 100A will now be described with reference to FIG. 2.

The projectors 100A, 100B, 100C, and 100D have substantially the same configuration. Therefore, the configuration of the projector 100A will be described as a representative of the projectors 100.

The projector 100A has an image I/F 110A, a remote control light receiver 120A, an image processor 130A, a frame memory 135A, an image projector 140A, and a controller 150A. The interface is hereinafter abbreviated as I/F.

The image I/F 110A has a connector and an interface circuit and is coupled to another projector 100 or the image supply device 300. In this embodiment, a case where the image I/F 110A is an HDMI interface conforming to the HDMI standard is described. HDMI is an abbreviation of High-Definition Multimedia Interface. HDMI is a registered trademark.

The image I/F 110A has a first receiver 111A, a second receiver 113A, a first transmitter 115A, and a second transmitter 117A. The first receiver 111A and the second receiver 113A have an HDMI connector and an HDMI receiver. The first transmitter 115A and the second transmitter 117A have an HDMI connector and an HDMI transceiver.

A configuration of coupling the image I/Fs 110 of the projectors 100A, 100B, 100C, and 100D will be described later with reference to FIGS. 3 and 4.

The remote control light receiver 120A receives an infrared signal transmitted from a remote controller 5 and outputs an operation signal corresponding to the content of an operation represented by the received infrared signal, to the controller 150A.

The remote controller 5 has an operator for performing an operation to a user interface. When the operator is operated by the user, the remote controller 5 transmits the infrared signal corresponding to the operated operator.

The frame memory 135A is coupled to the image processor 130A. The image processor 130A loads an image inputted from the controller 150A or the image I/F 110A into the frame memory 135A. The frame memory 135A has a plurality of banks. Each bank has a storage capacity in which an image corresponding to one frame can be written. The frame memory 135A is formed of, for example, an SDRAM (synchronous dynamic random-access memory).

The image processor 130A performs image processing such as resolution conversion or resizing, distortion correction, shape correction, digital zoom, or adjustment of the color tone or luminance of the image, on the image loaded in the frame memory 135A. The image processor 130A executes image processing designated by the controller 150A, and performs processing using a parameter inputted from the controller 150A according to need. Of course, the image processor 130A can also execute a combination of a plurality of types of image processing, of the above image processing. The image processor 130A reads out the image on which the processing is finished, from the frame memory 135A, and outputs the read-out image to the image projector 140A.

The image processor 130A and the frame memory 135A are formed of, for example, an integrated circuit. The integrated circuit includes an LSI (large-scale integrated circuit), an ASIC (application-specific integrated circuit), a PLD (programmable logic device), an FPGA (field-programmable gate array), a SoC (system-on-a-chip), or the like. An analog circuit may be included in a part of a configuration of the integrated circuit. Also, a configuration where the controller 150A and the integrated circuit are combined together may be employed.

The image projector 140A has a light source 141A, a light modulation device 143A, and an optical unit 147A.

The light source 141A has a discharge-type light source lamp such as an ultra-high-pressure mercury lamp or a metal halide lamp, or a solid-state light source such as a light-emitting diode or a semiconductor laser. The light emitted from the light source 141A enters the light modulation device 143A.

The light modulation device 143A has a light modulation element that modulates the light emitted from the light source 141A. In this embodiment, a transmission-type liquid crystal panel 145A formed of a pair of transparent substrates with a liquid crystal encapsulated therein is provided as the light modulation element. The liquid crystal panel 145A has a panel area formed of a plurality of pixels arranged in the form of a matrix. The light modulation device 143A applies a drive voltage corresponding to the inputted image, to each pixel in the panel area, and thus changes the light transmittance of each pixel to the transmittance corresponding to the image. As the light emitted from the light source 141A is transmitted through the liquid crystal panel 145A, the light is modulated and image light corresponding to the image is generated.

The light modulation element provided in the light modulation device 143A is not limited to the transmission-type liquid crystal panel and may be, for example, a reflection-type liquid crystal panel or a DMD (digital micromirror device).

The optical unit 147A has a projection lens or the like, not illustrated, and enlarges and projects the image light modulated by the light modulation device 143A onto the projection surface 10. Thus, a projection image that is an image corresponding to the image light is displayed on the projection surface 10.

The controller 150A is a computer device having a storage 160A and a processor 170A.

The storage 160A has a non-volatile memory such as a ROM (read-only memory) and a volatile memory such as a RAM (random-access memory). The ROM stores a control program 165A used to control operations of the projector 100A, and various setting information. The RAM is used to temporarily store various data or the like.

The processor 170A is a computational processing device having one or more CPUs (central processing units), an MPUs (micro-processing units), and the like. The processor 170A executes the control program 165A and thus controls operations of each part of the projector 100A.

3. Image Displayed on Projection Surface

Figure 3:
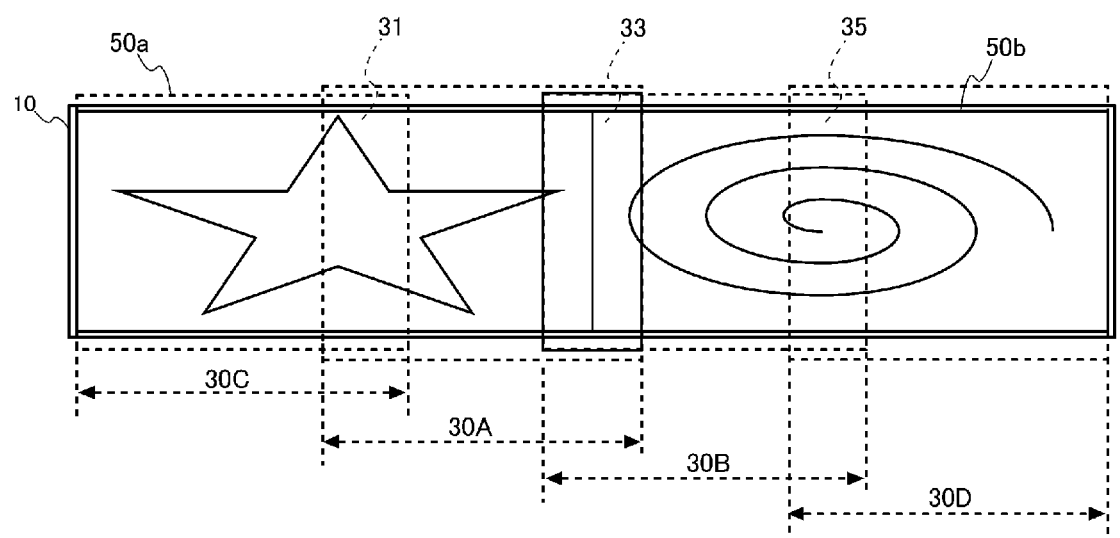
FIG. 3 shows a state where a first image and a second image are displayed on a projection surface.

FIG. 3 shows a state where a first image 50a and a second image 50b are displayed on the projection surface 10.

The first image 50a and the second image 50b are images outputted by the image supply device 300 as a multi-display screen, that is, one screen formed of two successive screens.

The first image 50a is displayed in the display area 30C, the display area 30A, and the display area 30B. Therefore, an image signal including the first image 50a needs to be supplied to the projectors 100A, 100B, and 100C. The image signal including the first image 50a is referred to as a first image signal S1.

The second image 50b is displayed in the display area 30A, the display area 30B, and the display area 30D. Therefore, an image signal including the second image 50b needs to be supplied to the projectors 100A, 100B, and 100D. The image signal including the second image 50b is referred to as a second image signal S2.

4. Coupling of Projectors 100

Figure 4:
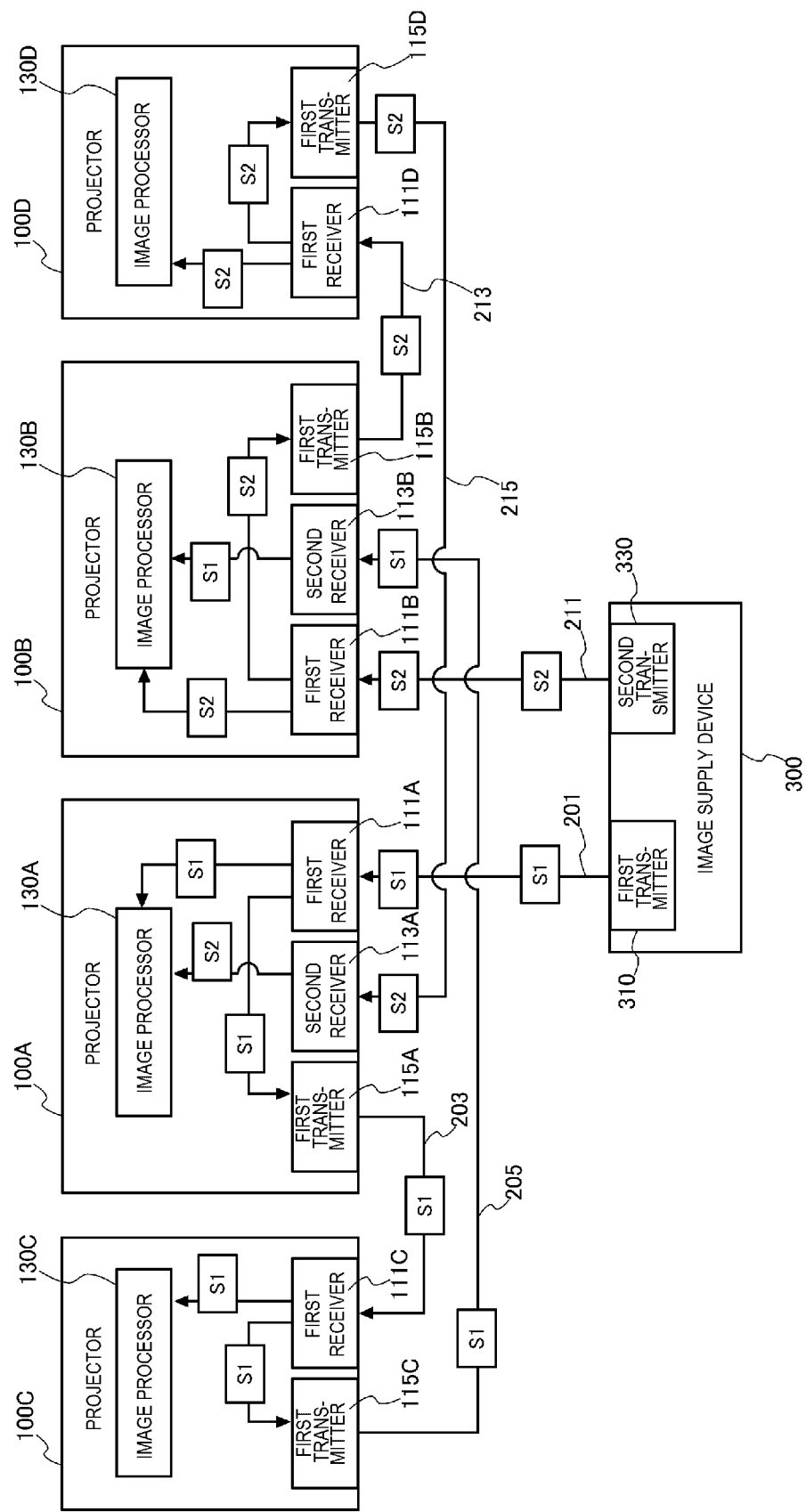
FIG. 4 shows a configuration of coupling an image supply device and projectors.

FIG. 4 shows a configuration of coupling the image supply device 300 and the projectors 100A, 100B, 100C, and 100D. S1 shown in FIG. 4 represents the first image signal S1. S2 shown in FIG. 4 represents the second image signal S2.

The image supply device 300 has a first transmitter 310 and a second transmitter 330.

The first transmitter 310 is coupled to the first receiver 111A of the projector 100A via an HDMI cable 201. The image supply device 300 transmits the first image signal S1 including the first image 50a to the projector 100A via the first transmitter 310. The projector 100A receives the first image signal S1 via the first receiver 111A. The first receiver 111A is equivalent to a first interface.

The second transmitter 330 is coupled to a first receiver 111B of the projector 100B via an HDMI cable 211. The image supply device 300 transmits the second image signal S2 including the second image 50b to the projector 100B via the second transmitter 330. The projector 100B receives the second image signal S2 via the first receiver 111B. The first receiver 111B is equivalent to a third interface.

The projectors 100A, 100B, 100C, and 100D are coupled in two lines of daisy-chaining.

A first line of daisy-chaining couples together the projector 100A, the projector 100C, and the projector 100B.

A second line of daisy-chaining couples together the projector 100B, the projector 100D, and the projector 100A.

First, the first line of daisy-chaining will be described.

The first transmitter 115A of the projector 100A and a first receiver 111C of the projector 100C are coupled together via an HDMI cable 203.

A first transmitter 115C of the projector 100C and a second receiver 113B of the projector 100B are coupled together via an HDMI cable 205.

The projector 100A takes out the first image 50a included in the first image signal S1 received by the first receiver 111A and outputs the first image 50a that is taken out, to the image processor 130A. The projector 100A also outputs the first image signal S1 received by the first receiver 111A to the first transmitter 115A. The first transmitter 115A transmits the inputted first image signal S1 to the projector 100C.

The projector 100C receives the first image signal S1 via the first receiver 111C. The first receiver 111C is equivalent to a fifth interface. The projector 100C takes out the first image 50a included in the first image signal S1 received via the first receiver 111C and outputs the first image 50a that is taken out, to an image processor 130C. The projector 100C also outputs the first image signal S1 received via the first receiver 111C to the first transmitter 115C. The first transmitter 115C transmits the inputted first image signal S1 to the projector 100B. The first transmitter 115C is equivalent to a sixth interface.

The projector 100B receives the first image signal S1 via the second receiver 113B. The projector 100B takes out the first image 50a included in the first image signal S1 received via the second receiver 113B and outputs the first image 50a that is taken out, to an image processor 130B.

The second line of daisy-chaining will now be described.

A first transmitter 115B of the projector 100B and a first receiver 111D of the projector 100D are coupled together via an HDMI cable 213.

A first transmitter 115D of the projector 100D and the second receiver 113A of the projector 100A are coupled together via an HDMI cable 215.

The projector 100B takes out the second image 50b included in the second image signal S2 received via the first receiver 111B and outputs the second image 50b that is taken out, to the image processor 130B. The projector 100B also outputs the second image signal S2 received via the first receiver 111B to the first transmitter 115B. The first transmitter 115B transmits the inputted second image signal S2 to the projector 100D.

The projector 100D receives the second image signal S2 via the first receiver 111D. The first receiver 111D is equivalent to a seventh interface. The projector 100D takes out the second image 50b included in the second image signal S2 received via the first receiver 111D and outputs the second image 50b that is taken out, to an image processor 130D. The projector 100D also outputs the second image signal S2 received via the first receiver 111D to the first transmitter 115D. The first transmitter 115D transmits the inputted second image signal S2 to the projector 100A. The first transmitter 115D is equivalent to an eighth interface.

The projector 100A receives the second image signal S2 via the second receiver 113A. The second receiver 113A is equivalent to a second interface. The projector 100A takes out the second image 50b included in the second image signal S2 received via the second receiver 113A and outputs the second image 50b that is taken out, to the image processor 130A.

Figure 5:
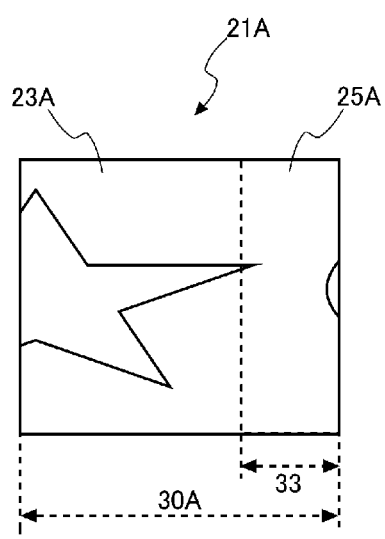
FIG. 5 shows a first composite image.

FIG. 5 shows a first composite image 21A. More specifically, it is an illustration of the image displayed by the projector 100A sliced out of the image displayed on the projection surface 10 shown in FIG. 3.

The image processor 130A of the projector 100A combines together at least a part of the inputted first image 50a and apart of the second image 50b, thus generates the first composite image 21A, and projects image light based on the generated first composite image 21A into the display area 30A.

Of the first composite image 21A, an image displayed in the range of the display area 30A excluding the display superimposition area 33 is referred to as a first area 23A. The first area 23A includes at least a part of the first image 50a.

Of the first composite image 21A, an image displayed in the display superimposition area 33 is referred to as a first superimposition area 25A. The first superimposition area 25A includes the range excluding the first area 23A, of the first image 50a, and a part of the second image 50b.

Figure 6:
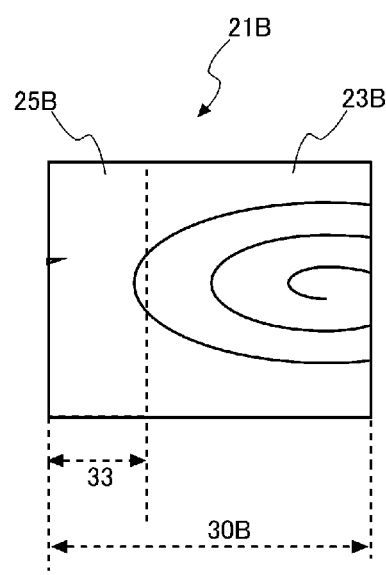
FIG. 6 shows a second composite image.

FIG. 6 shows a second composite image 21B. More specifically, it is an illustration of the image displayed by the projector 100B sliced out of the image displayed on the projection surface 10 shown in FIG. 3.

The image processor 130B of the projector 100B combines together a part of the inputted first image 50a and at least a part of the second image 50b, thus generates the second composite image 21B, and projects image light based on the generated second composite image 21B into the display area 30B.

Of the second composite image 21B, an image displayed in the range of the display area 30B excluding the display superimposition area 33 is referred to as a second area 23B. The second area 23B includes at least a part of the second image 50b.

Of the second composite image 21B, an image displayed in the display superimposition area 33 is referred to as a second superimposition area 25B. The second superimposition area 25B includes the range excluding the second area 23B, of the second image 50b, and a part of the first image 50a.

Figure 7:
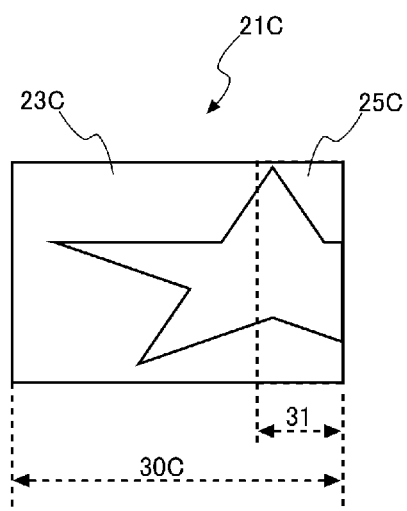
FIG. 7 shows an image based on a first image.

FIG. 7 shows an image 21C based on the first image 50a displayed by the projector 100C. More specifically, it is an illustration of the image displayed by the projector 100C sliced out of the image displayed on the projection surface 10 shown in FIG. 3. The image processor 130C of the projector 100C projects the image 21C based on the inputted first image 50a into the display area 30C.

Of the image 21C, an image displayed in the range of the display area 30C excluding the display superimposition area 31 is referred to as a third area 23C. Of the image 21C, an image displayed in the display superimposition area 31 is referred to as a third superimposition area 25C.

Figure 8:
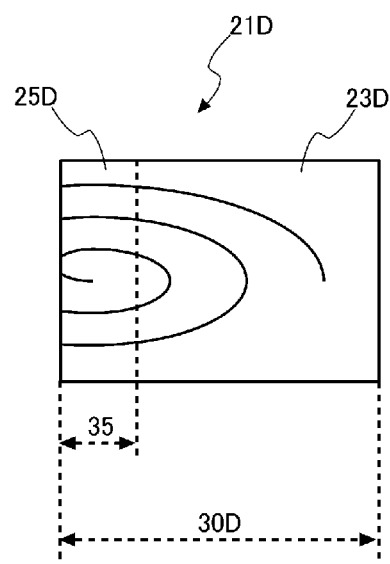
FIG. 8 shows an image based on a second image.

FIG. 8 shows an image 21D based on the second image 50b displayed by the projector 100D. More specifically, it is an illustration of the image displayed by the projector 100D sliced out of the image displayed on the projection surface 10 shown in FIG. 3.

The image processor 130D of the projector 100D projects the image 21D based on the inputted second image 50b into the display area 30D.

Of the image 21D, an image displayed in the range excluding the display superimposition area 35 is referred to as a fourth area 23D. Of the image 21D, an image displayed in the display superimposition area 35 is referred to as a fourth superimposition area 25D.

In the display superimposition area 33, the first superimposition area 25A of the first composite image 21A and the second superimposition area 25B of the second composite image 21B are displayed as superimposed.

In the display superimposition area 31, a part of the first area 23A of the first composite image 21A and the third superimposition area 25C of the image 21C are displayed as superimposed.

In the display superimposition area 35, a part of the second area 23B of the second composite image 21B and the fourth superimposition area 25D of the image 21D are displayed as superimposed.

5. Operations of Projector

Operations of the projector 100 will now be described.

Figure 9:
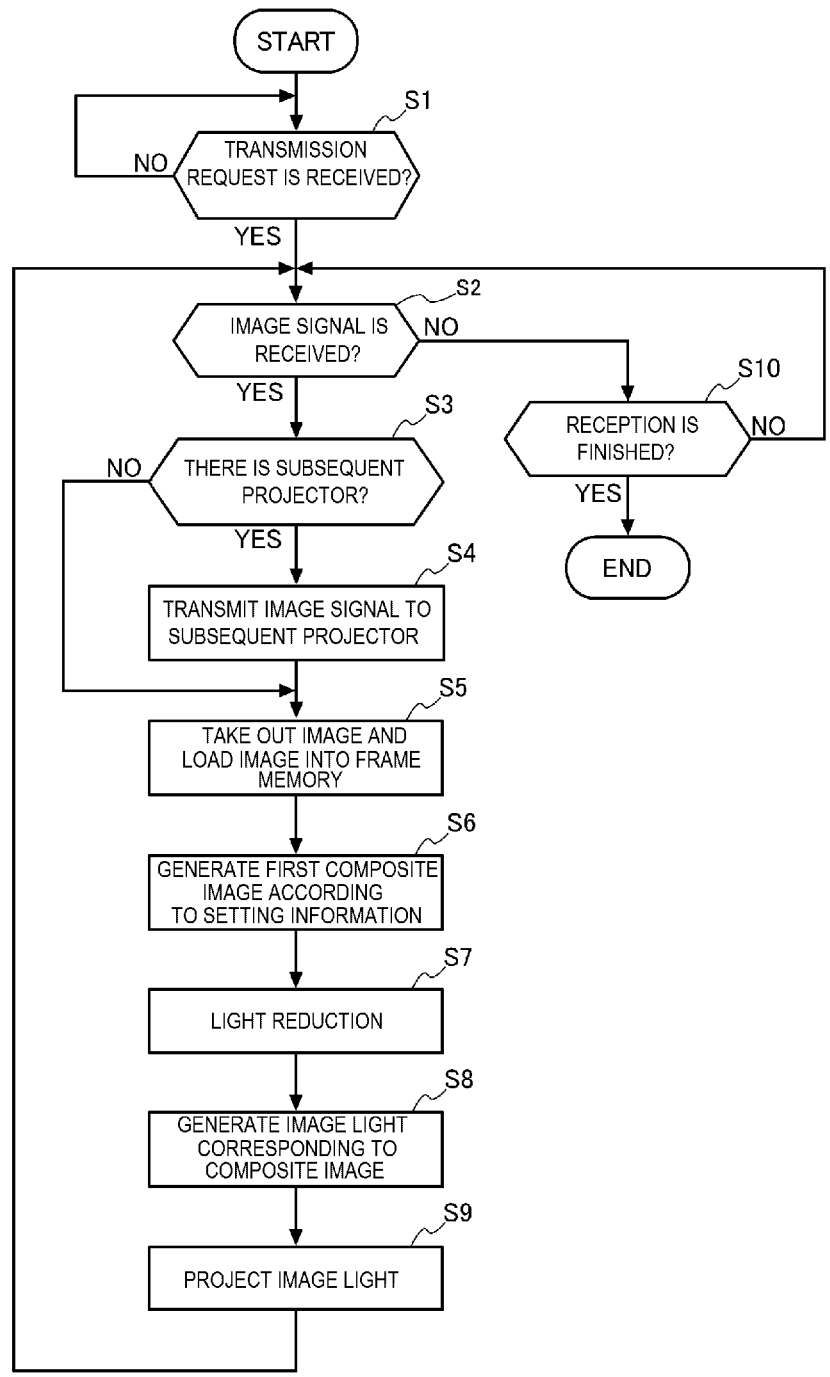
FIG. 9 is a flowchart showing operations of the projector.

FIG. 9 is a flowchart showing operations of the projector 100A.

Operations of the projectors 100A, 100B, 100C, and 100D are substantially the same. Therefore, the operations of the projector 100A will be described here.

The projector 100 displays, on the projection surface 10, an OSD (on-screen display) screen where an arrangement of the projector 100, a start position and an end position of an area to perform edge blending, or the like, can be set as prior settings. The user operates the remote controller 5 while viewing the display on the OSD screen, and thus inputs these settings. The projector 100 generates setting information setting the arrangement of the projector 100, the start position and the end position of edge blending, or the like, in response to the input from the remote controller 5.

The projectors 100A, 100B, 100C, and 100D may each configure this setting. Also, one of the projectors 100 coupled in the first line of daisy-chaining and one of the projectors 100 coupled in the second line of daisy-chaining may each configure this setting. The projector 100 having accepted the setting transmits setting information to another daisy-chained projector 100. Also, the image supply device 300, which is a personal computer, may generate setting information and transmit the generated setting information to each projector 100.

First, the controller 150A determines whether a transmission request for image signal is received from the image supply device 300 or not (step S1). When a transmission request for image signal is not received (NO in step S1), the controller 150A waits until a transmission request for image signal is received (step S1).

When a transmission request for image signal is received (YES in step S1), the controller 150A determines whether an image signal is received or not (step S2). When an image signal is not received (NO in step S2), the controller 150A proceeds to the determination of step S10.

When an image signal is received (YES in step S2), the controller 150A determines whether there is a projector 100 that is daisy-chained subsequently to the projector 100A or not (step S3). In the first line of daisy-chaining, the projector 100C is coupled subsequently to the projector 100A. When there is a daisy-chained subsequent projector 100 (YES in step S3), the controller 150A transmits the received image signal to the subsequent projector 100 (step S4).

Meanwhile, when there is no subsequent projector 100 (NO in step S3) or after the image signal is transmitted to the subsequent projector 100 (step S4), the controller 150A causes the image I/F 110A to take out an image included in the image signal (step S5). When the first image signal S1 is received, the image I/F 110A takes out the first image 50a included in the received first image signal S1 and outputs the first image 50a that is taken out, to the image processor 130A. When the second image signal S2 is received, the image I/F 110A takes out the second image 50b included in the received second image signal S2 and outputs the second image 50b that is taken out, to the image processor 130A.

The image processor 130A loads the first image 50a inputted from the image I/F 110A into a first bank of the frame memory 135A and loads the inputted second image 50b into a second bank of the frame memory 135A (step S5).

The image processor 130A reads out the first image 50a from the first bank and loads the first image 50a that is read out, into a third bank according to the setting information. Similarly, the image processor 130A reads out the second image 50b from the second bank and loads the second image 50b that is read out, into the third bank according to the setting information. Thus, the first composite image 21A to be projected by the projector 100A is generated in the third bank of the frame memory 135A (step S6).

The image processor 130A performs light reduction to adjust the luminance of the first composite image 21A loaded in the third bank and thus reduces the difference in luminance in the display superimposition area 31, where the image displayed by the projector 100C and the image displayed by the projector 100A overlap each other (step S7). Similarly, the image processor 130A performs light reduction to adjust the luminance of the first composite image 21A and thus reduces the difference in luminance in the display superimposition area 33, where the image displayed by the projector 100A and the image displayed by the projector 100B overlap each other (step S7).

Next, the image processor 130A reads out the first composite image 21A that is light-reduced, from the frame memory 135A, and outputs the first composite image 21A that is read out, to the light modulation device 143A. The light modulation device 143A applies a drive voltage corresponding to the inputted first composite image 21A to each pixel in the liquid crystal panel 145A and thus changes the light transmittance of each pixel to a transmittance corresponding to the first composite image 21A. As the light emitted from the light source 141A is transmitted through the liquid crystal panel 145A, image light corresponding to the first composite image 21A is generated (step S8). The image light generated by the light modulation device 143A is enlarged and projected onto the projection surface 10 by the optical unit 147A. Thus, the first composite image 21A is displayed on the projection surface 10 (step S9).

Subsequently, the controller 150A returns to the determination of step S2. When an image signal is not received (NO in step S2), the controller 150A determines whether the reception of an image signal is finished or not (step S10). When the reception of an image signal is not finished (NO in step S10), the controller 150A returns to the determination of step S2.

When the reception of an image signal is finished (YES in step S10), the controller 150A ends this processing flow.

6. Another Form of Coupling Projectors

Figure 10:
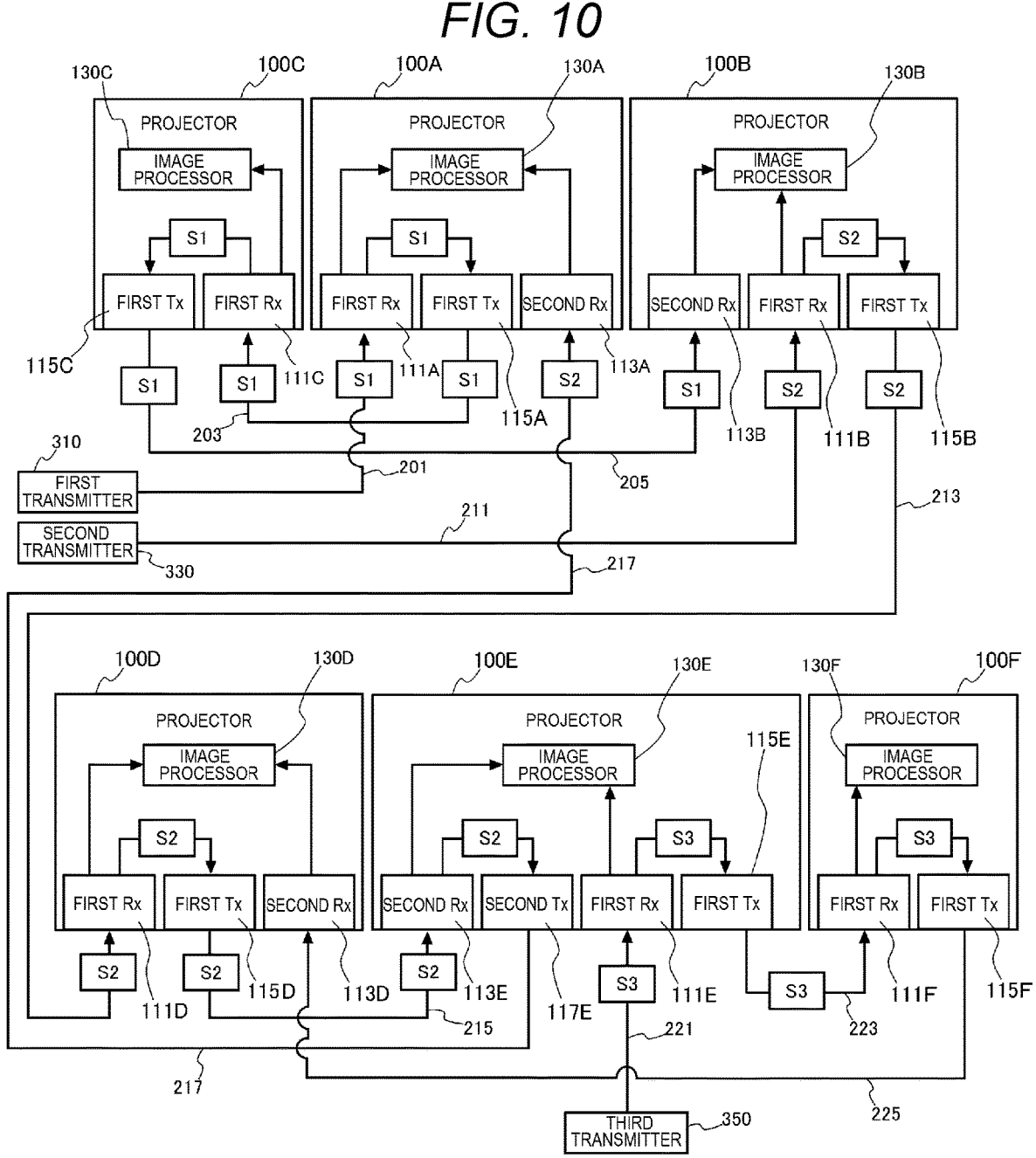
FIG. 10 shows a configuration of coupling where six projectors are coupled.

FIG. 10 shows an example of a configuration of coupling six projectors 100, that is, projectors 100A, 100B, 100C, 100D, 100E, and 100F, to the image supply device 300.

FIG. 10 shows a state where the six projectors 100, that is, the projectors 100C, 100A, 100B, 100D, 100E, and 100F, are arranged in a line along the horizontal direction of the projection surface 10. For the convenience of illustration, the projectors 100C, 100A, and 100B, and the projectors 100D, 100E, and 100F are illustrated separately in two lines. Also, for the convenience of illustration, the illustration of the entirety of the image supply device 300 is omitted and only the first transmitter 310, the second transmitter 330, and a third transmitter 350 are shown.

Figure 11:
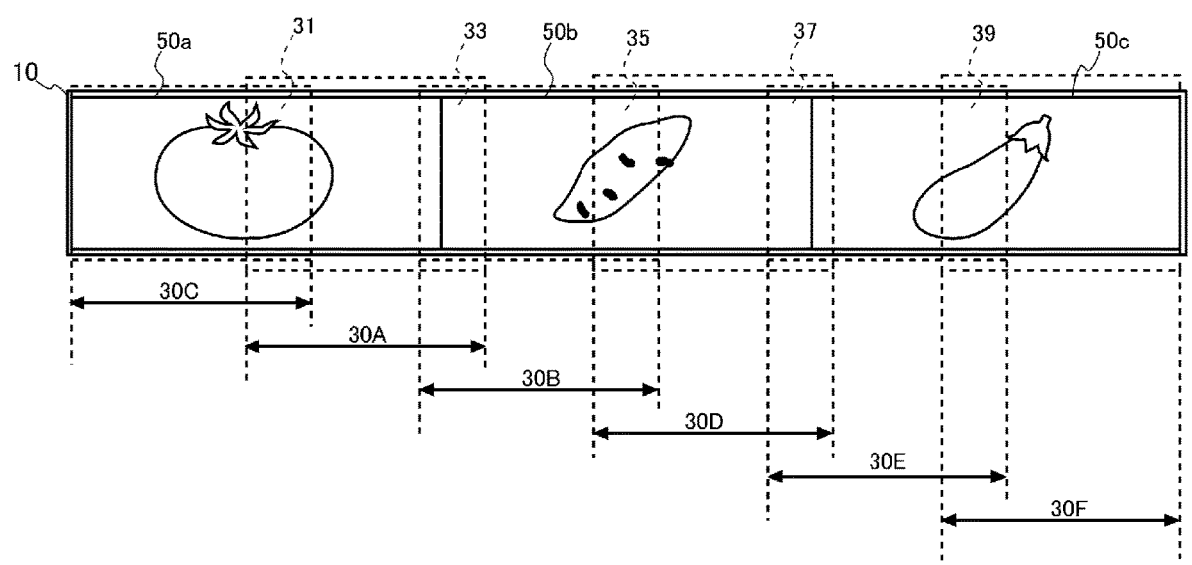
FIG. 11 shows a state where the first image, the second image, and a third image are displayed on the projection surface.

FIG. 11 shows a state where three images, that is, the first image 50a, the second image 50b, and a third image 50c, are displayed on the projection surface 10.

The first image 50a, the second image 50b, and the third image 50c are images outputted by the image supply device 300 as a multi-display screen, that is, one screen formed of three successive screens.

The first image 50a is displayed in the display area 30C, the display area 30A, and the display area 30B. The first image signal S1 including the first image 50a needs to be supplied to the projectors 100A, 100B, and 100C.

The second image 50b is displayed in the display area 30A, the display area 30B, the display area 30D, and a display area 30E. The display area 30E is an area where image light projected by the projector 100E is projected. The projector 100E is arranged to the right of the projector 100D as viewed in the drawing. The second image signal S2 including the second image 50b needs to be supplied to the projectors 100A, 100B, 100D, and 100E.

The third image 50c is displayed in the display area 30D, the display area 30E, and a display area 30F. The display area 30F is an area where image light projected by the projector 100F is projected. The projector 100F is arranged to the right of the projector 100E as viewed in the drawing. Therefore, a third image signal S3 including the third image 50c needs to be supplied to the projectors 100D, 100E, and 100F.

When the three images, that is, the first image 50a, the second image 50b, and the third image 50c, are displayed on the projection surface 10, display superimposition areas 37 and 39 are formed in addition to the display superimposition areas 31, 33, 35, as the display superimposition area.

An area where the right end of the display area 30D and the left end of the display area 30E overlap each other as viewed in the drawing is referred to as the display superimposition area 37. An area where the right end of the display area 30E and the left end of the display area 30F overlap each other as viewed in the drawing is referred to as the display superimposition area 39.

The image supply device 300 has the third transmitter 350 in addition to the first transmitter 310 and the second transmitter 330.

The first transmitter 310 is coupled to the first receiver 111A of the projector 100A via the HDMI cable 201. The image supply device 300 transmits the first image signal S1 including the first image 50a from the first transmitter 310 to the projector 100A.

The second transmitter 330 is coupled to the first receiver 111B of the projector 100B via the HDMI cable 211. The image supply device 300 transmits the second image signal S2 including the second image 50b from the second transmitter 330 to the projector 100B.

The third transmitter 350 is coupled to a first receiver 111E of the projector 100E via an HDMI cable 221. The image supply device 300 transmits the third image signal S3 including the third image 50c from the third transmitter 350 to the projector 100E.

The projectors 100A, 100B, 100C, 100D, 100E, and 100F are coupled in three lines of daisy-chaining.

A first line of daisy-chaining couples together the projector 100A, the projector 100C, and the projector 100B.

A second line of daisy-chaining couples together the projector 100B, the projector 100D, the projector 100E, and the projector 100A.

A third line of daisy-chaining couples together the projector 100E, the projector 100F, and the projector 100D.

S1 shown in FIG. 10 represents the first image signal S1. S2 shown in FIG. 10 represents the second image signal S2. S3 shown in FIG. 10 represents the third image signal S3.

First, the first line of daisy-chaining will be described.

The first transmitter 115A of the projector 100A and the first receiver 111C of the projector 100C are coupled together via the HDMI cable 203.

The first transmitter 115C of the projector 100C and the second receiver 113B of the projector 100B are coupled together via the HDMI cable 205.

The projector 100A takes out the first image 50a included in the first image signal S1 received via the first receiver 111A and outputs the first image 50a that is taken out, to the image processor 130A. The projector 100A also outputs the first image signal S1 received via the first receiver 111A to the first transmitter 115A. The first transmitter 115A transmits the inputted first image signal S1 to the projector 100C.

The projector 100C receives the first image signal S1 via the first receiver 111C. The projector 100C takes out the first image 50a included in the first image signal S1 received via the first receiver 111C and outputs the first image 50a that is taken out, to the image processor 130C. The projector 100C also outputs the first image signal S1 received via the first receiver 111C to the first transmitter 115C. The first transmitter 115C transmits the inputted first image signal S1 to the projector 100B.

The projector 100B receives the first image signal S1 via the second receiver 113B. The second receiver 113B is equivalent to a fourth interface. The projector 100B takes out the first image 50a included in the first image signal S1 received via the second receiver 113B and outputs the first image 50a that is taken out, to the image processor 130B.

The second line of daisy-chaining will now be described.

The first transmitter 115B of the projector 100B and the first receiver 111D of the projector 100D are coupled together via the HDMI cable 213.

The first transmitter 115D of the projector 100D and a second receiver 113E of the projector 100E are coupled together via the HDMI cable 215.

A second transmitter 117E of the projector 100E and the second receiver 113A of the projector 100A are coupled together via an HDMI cable 217.

The projector 100B takes out the second image 50b included in the second image signal S2 received via the first receiver 111B and outputs the second image 50b that is taken out, to the image processor 130B. The projector 100B also outputs the second image signal S2 received via the first receiver 111B to the first transmitter 115B. The first transmitter 115B transmits the inputted second image signal S2 to the projector 100D.

The projector 100D receives the second image signal S2 via the first receiver 111D. The projector 100D takes out the second image 50b included in the second image signal S2 received via the first receiver 111D and outputs the second image 50b that is taken out, to the image processor 130D. The projector 100D also outputs the second image signal S2 received via the first receiver 111D to the first transmitter 115D. The first transmitter 115D transmits the inputted second image signal S2 to the projector 100E.

The projector 100E receives the second image signal S2 via the second receiver 113E. The projector 100E takes out the second image 50b included in the second image signal S2 received via the second receiver 113E and outputs the second image 50b that is taken out, to an image processor 130E. The projector 100E also outputs the second image signal S2 received via the second receiver 113E to the second transmitter 117E. The second transmitter 117E transmits the inputted second image signal S2 to the projector 100A.

The projector 100A receives the second image signal S2 via the second receiver 113A. The projector 100A takes out the second image 50b included in the second image signal S2 received via the second receiver 113A and outputs the second image 50b that is taken out, to the image processor 130A.

The third line of daisy-chaining will now be described.

A first transmitter 115E of the projector 100E and a first receiver 111F of the projector 100F are coupled together via an HDMI cable 223.

A first transmitter 115F of the projector 100F and a second receiver 113D of the projector 100D are coupled together via an HDMI cable 225.

The projector 100E takes out the third image 50c included in the third image signal S3 received via the first receiver 111E and outputs the third image 50c that is taken out, to the image processor 130E. The projector 100E also outputs the third image signal S3 received via the first receiver 111E to the first transmitter 115E. The first transmitter 115E transmits the inputted third image signal S3 to the projector 100F.

The projector 100F receives the third image signal S3 via the first receiver 111F. The projector 100F takes out the third image 50c included in the third image signal S3 received via the first receiver 111F and outputs the third image 50c that is taken out, to an image processor 130F. The projector 100F also outputs the third image signal S3 received via the first receiver 111F to the first transmitter 115F. The first transmitter 115F transmits the inputted third image signal S3 to the projector 100D.

The projector 100D receives the third image signal S3 via the second receiver 113D. The projector 100D takes out the third image 50c included in the third image signal S3 received via the second receiver 113D and outputs the third image 50c that is taken out, to the image processor 130D and causes the image processor 130D to perform image processing.

7. Effects of Control Method for Display System

As described above, this embodiment discloses a control method for the display system 1.

The projector 100A receives the first image 50a via the first receiver 111A provided in the projector 100A.

The projector 100A receives the second image 50b via the second receiver 113A provided in the projector 100A.

The projector 100A generates the first composite image 21A including the first image 50a and a part of the second image 50b.

The projector 100A displays the first composite image 21A on the projection surface 10.

The projector 100B receives the second image 50b via the first receiver 111B provided in the projector 100B.

The projector 100B displays the second image 50b on the projection surface 10.

The first composite image 21A includes the first area 23A, which is a part of the first composite image 21A, and the first superimposition area 25A, which is a different part from the first area 23A of the first composite image 21A and includes a part of the second image 50b.

The second image 50b includes the second superimposition area 25B, which includes a part of the second image 50b and is superimposed on the first superimposition area 25A at the projection surface 10, and the second area 23B, which is a different part from the second superimposition area 25B.

Thus, the projector 100A receives the first image 50a and the second image 50b and displays the first composite image 21A formed by combining the first image 50a or the second image 50b on the projection surface 10. The projector 100B receives the second image 50b and displays the second image 50b on the projection surface 10. Therefore, the projectors 100A and 100B can achieve the display of a large screen using an image with a larger size than when only one of the first image 50a and the second image 50b is used.

The projector 100B receives the first image 50a via the second receiver 113B provided in the projector 100B.

The projector 100B generates the second composite image 21B based on the first image 50a and the second image 50b. The projector 100B displays the generated second composite image 21B on the projection surface 10.

Displaying the second composite image 21B is displaying the second image 50b as a part of the second composite image 21B.

The first superimposition area 25A includes a part of the first image 50a and a part of the second image 50b.

The second superimposition area 25B includes a part of the first image 50a and a part of the second image 50b.

Thus, the projector 100B receives the first image 50a and the second image 50b and displays the second composite image 21B formed by combining the first image 50a or the second image 50b on the projection surface 10. As the image displayed in the first superimposition area 25A and the second superimposition area 25B, an image including apart of the first image 50a and a part of the second image 50b can be used.

The projector 100A performs edge blending on the first superimposition area 25A. The projector 100B performs edge blending on the second superimposition area 25B.

Thus, an edge-blended image can be displayed in the first superimposition area 25A and the second superimposition area 25B and a deterioration in the image quality in the display superimposition areas 31, 33, 35 can be restrained.

The projector 100A transmits the first image 50a to the projector 100C.

The projector 100B transmits the second image 50b to the projector 100D.

The projector 100C receives the first image 50a transmitted from the projector 100A, via the first receiver 111C provided in the projector 100C.

The projector 100C transmits the first image 50a to the projector 100B via the first transmitter 115C provided in the projector 100C.

The projector 100C displays an image based on the first image 50a, on the projection surface 10.

The projector 100D receives the second image 50b transmitted from the projector 100B, via the first receiver 111D provided in the projector 100D.

The projector 100D transmits the second image 50b to the projector 100A via the first transmitter 115D provided in the projector 100D.

The projector 100D displays an image based on the second image 50b, on the projection surface 10.

Receiving the second image 50b via the second receiver 113A provided in the projector 100A is receiving the second image 50b transmitted via the first transmitter 115D provided in the projector 100D.

Receiving the first image 50a via the second receiver 113B provided in the projector 100B is receiving the first image 50a transmitted from the first transmitter 115C provided in the projector 100C.

Thus, one large-screen image can be displayed on the projection surface 10 by the projectors 100A, 100B, 100C, and 100D.

The image 21C based on the first image 50a includes the third superimposition area 25C superimposed on a part of the first area 23A of the first composite image 21A at the projection surface 10, and the third area 23C, which is a different part from the third superimposition area 25C, of the image 21C based on the first image 50a.

The image 21D based on the second image 50b includes the fourth superimposition area 25D superimposed on a part of the second area 23B of the second composite image 21B at the projection surface 10, and the fourth area 23D, which is a different part from the fourth superimposition area 25D, of the image 21D based on the second image 50b.

Thus, an image including the third superimposition area 25C and the third area 23C can be displayed as the image 21C based on the first image 50a displayed on the projection surface 10.

Also, an image including the fourth superimposition area 25D and the fourth area 23D can be displayed as the image 21D based on the second image 50b displayed on the projection surface 10.

8. Effects of Control Method for Display Device

The projector 100A receives the first image 50a via the first receiver 111A provided in the projector 100A.

The projector 100A receives the second image 50b via the second receiver 113A provided in the projector 100A.

The projector 100A generates the first composite image 21A including the first image 50a and apart of the second image 50b.

The projector 100A displays the first composite image 21A on the projection surface 10.

The first composite image 21A includes the first area 23A, which is a part of the first composite image 21A, and the first superimposition area 25A, which is a different part from the first area 23A of the first composite image 21A and includes a part of the second image 50b.

In the area where the first superimposition area 25A is displayed, of the projection surface 10, a part of the second image 50b is displayed by another projector 100.

Thus, the projector 100A receives the first image 50a and the second image 50b by the receivers 111A and 113A and generates the first composite image 21A. Therefore, the projector 100A can receive the first image 50a and the second image 50b of a size that can be received via the receivers 111A and 113A provided in the projector 100A, combine the first image 50a or the second image 50b, and display the first composite image 21A formed by the combining, on the projection surface 10.

The projector 100A receives the first image 50a and the second image 50b and therefore can display an edge-blended image in the display superimposition area 33 and thus can restrain a deterioration in the image quality in the display superimposition area 33.

9. Effects of Display Device

The projector 100A has the first receiver 111A, the second receiver 113A, and the controller 150A.

The first receiver 111A receives the first image 50a.

The second receiver 113A receives the second image 50b.

The controller 150A generates the first composite image 21A including the first image 50a and a part of the second image 50b.

The controller 150A displays the first composite image 21A on the projection surface 10.

The first composite image 21A includes the first area 23A, which is a part of the first composite image 21A, and the first superimposition area 25A, which is a different part from the first area 23A of the first composite image 21A and includes a part of the second image 50b.

In the area where the first superimposition area 25A is displayed, of the projection surface 10, a part of the second image 50b is displayed by another projector 100.

Thus, the projector 100A receives the first image 50a and the second image 50b by the receivers 111A and 113A. Therefore, the projector 100A can receive the first image 50a and the second image 50b of a size that can be received via the receivers 111A and 113A provided in the projector 100A, combine the first image 50a or the second image 50b into an image with a larger size than the first image 50a or the second image 50b, and display the combined image on the projection surface 10.

The projector 100A receives the first image 50a and the second image 50b and therefore can display an edge-blended image in the display superimposition area 33 and thus can restrain a deterioration in the image quality in the display superimposition area 33.

The above embodiment is a preferred embodiment of the present disclosure. However, the present disclosure is not limited to the above embodiment and can be implemented with various modifications without departing from the spirit and scope of the present disclosure. For example, as a cable for image transmission that couples the image supply device 300 and the projector 100 together, a cable conforming to a standard such as USB (Universal Serial Bus) or DisplayPort may be used.

The functional units of the projector 100 shown in FIG. 2 represent a functional configuration and are particularly not limited to any specific form of installation. That is, individual pieces of hardware corresponding to the individual functional units need not necessarily be installed. Of course, a configuration where a single processor executes a program and thus implements a plurality of functional units can be employed. A part of the functions implemented by software in the embodiment may be implemented by hardware. Also, a part of the functions implemented by hardware may be implemented by software. The specific detailed configuration of each of the other parts of the projector can be arbitrarily changed without departing from the spirit and scope of the present disclosure.

The processing steps in the flowchart shown in FIG. 9 are provided by dividing the processing according to the main content of the processing in order to facilitate the understanding of the processing by the projector 100A. The way the processing is divided into processing steps and the names of the processing steps shown in the flowchart of FIG. 9 do not limit the present disclosure. The processing by the controller 150A may be divided into more processing steps or may be divided in such a way that one processing step includes more processing, according to the content of the processing. The order of processing in the flowchart is not limited to the illustrated example, either.

When implemented by the computer provided in the projector 100, the control method for the display system and the control method for the display device can also be configured in the form of a recording medium in which a program to be executed by the computer is recorded or a transmission medium transmitting this program. As the recording medium, a magnetic or optical recording medium, or a semiconductor memory device can be used. Specifically, a portable recording medium such as a flexible disk, an HDD (hard disk drive), a CD-ROM, a DVD, a Blu-ray disc, a magneto-optical disk, a flash memory or a card-type recording medium, or a fixed recording medium may be employed. The recording medium may also be a non-volatile storage device such as a RAM, a ROM or an HDD that is an internal storage device provided in a server device. Blu-ray is a registered trademark.

What is claimed is:

1. A display control method comprising:
   receiving, by a first display device, a first image via a first interface of the first display device;
   receiving, by the first display device, a second image via a second interface of the first display device, the second interface being different from the first interface;
   generating a first composite image based on the first image and the second image separately received from the first interface and the second interface, respectively, the first composite image including the first image and a part of the second image;
   displaying, by the first display device, the first composite image on a display surface;
   receiving, by a second display device, the second image via a third interface of the second display device; and
   displaying, by the second display device, the second image on the display surface,
   the first composite image including
      a first area, and
      a first superimposition area that is a different part from the first area and that includes the part of the second image,
   the second image including
      a second superimposition area including the part of the second image and superimposed on the first superimposition area at the display surface, and
      a second area that is a different part from the second superimposition area of the second image.

2. The display control method according to claim 1, further comprising:
   receiving, by the second display device, the first image via a fourth interface of the second display device; and
   displaying, by the second display device, a second composite image based on the second image and the first image, on the display surface, wherein
   displaying the second image is displaying the second image as a part of the second composite image,
   the first superimposition area includes a part of the first image and a part of the second image, and
   the second superimposition area includes the part of the first image and the part of the second image.

3. The display control method according to claim 2, further comprising:
- transmitting, by the first display device, the first image to a third display device;
- receiving, by the third display device, the first image via a fifth interface of the third display device;
- transmitting, by the third display device, the first image to the fourth interface of the second display device via a sixth interface of the third display device; and
- displaying, by the third display device, an image based on the first image, on the display surface.

4. The display control method according to claim 3, further comprising:
- transmitting, by the second display device, the second image to a fourth display device;
- receiving, by the fourth display device, the second image via a seventh interface of the fourth display device;
- transmitting, by the fourth display device, the second image to the second interface of the first display device via an eighth interface of the fourth display device; and
- displaying, by the fourth display device, an image based on the second image, on the display surface.

5. The display control method according to claim 4, wherein
the image based on the second image includes
- a fourth superimposition area superimposed on a part of the second area of the second composite image at the display surface, and
- a fourth area that is a different part from the fourth superimposition area.

6. The display control method according to claim 3, wherein
the image based on the first image includes
- a third superimposition area superimposed on a part of the first area of the first composite image at the display surface, and
- a third area that is a different part from the third superimposition area.

7. The display control method according to claim 1, further comprising:
- performing, by the first display device, edge blending on the first superimposition area; and
- performing, by the second display device, edge blending on the second superimposition area.

8. A control method for a display device, the control method comprising:
- receiving a first image via a first interface of a display device;
- receiving a second image via a second interface of the display device, the second interface being different from the first interface;
- generating a first composite image based on the first image and the second image separately received from the first interface and the second interface, respectively, the first composite image including the first image and a part of the second image; and
- displaying the first composite image on a display surface, the first composite image including
  - a first area, and
  - a first superimposition area that is a different part from the first area and that includes the part of the second image,
- the first superimposition area being superimposed on the part of the second image displayed by another display device at the display surface, the second image including a second superimposition area including the part of the second image and superimposed on the first superimposition area at the display surface, and a second area that is a different part from the second superimposition area of the second image.

9. A display device comprising:
- a first interface receiving a first image;
- a second interface receiving a second image, the second interface being different from the first interface; and
- at least one processor executing
- generating a first composite image based on the first image and the second image separately received from the first interface and the second interface, respectively, the first composite image including the first image and a part of the second image, and
- displaying the first composite image on a display surface, the first composite image including
  - a first area, and
  - a first superimposition area that is a different part from the first area and that includes the part of the second image,
- the first superimposition area being superimposed on the part of the second image displayed by another display device at the display surface, the second image including a second superimposition area including the part of the second image and superimposed on the first superimposition area at the display surface, and a second area that is a different part from the second superimposition area of the second image.

* * * * *